US 7,644,255 B2

(12) United States Patent
Totsuka

(10) Patent No.: US 7,644,255 B2
(45) Date of Patent: Jan. 5, 2010

(54) METHOD AND APPARATUS FOR ENABLE/DISABLE CONTROL OF SIMD PROCESSOR SLICES

(75) Inventor: Yonetaro Totsuka, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 583 days.

(21) Appl. No.: 11/034,693

(22) Filed: Jan. 13, 2005

(65) Prior Publication Data
US 2006/0155964 A1 Jul. 13, 2006

(51) Int. Cl.
G06F 15/00 (2006.01)
G06F 15/76 (2006.01)
(52) U.S. Cl. .............................. 712/22; 712/10; 712/18; 712/25
(58) Field of Classification Search .................... 712/10, 712/22, 215, 216, 201, 209, 217, 218, 25, 712/18
See application file for complete search history.

(56) References Cited

U.S. PATENT DOCUMENTS

| 4,907,148 | A | * | 3/1990 | Morton | 712/22 |
|---|---|---|---|---|---|
| 4,933,895 | A | * | 6/1990 | Grinberg et al. | 708/509 |
| 5,045,995 | A | * | 9/1991 | Levinthal et al. | 712/236 |
| 5,060,148 | A | * | 10/1991 | Isobe et al. | 712/6 |
| 5,471,593 | A | * | 11/1995 | Branigin | 712/235 |
| 5,475,856 | A | * | 12/1995 | Kogge | 712/20 |
| 5,542,074 | A | * | 7/1996 | Kim et al. | 712/22 |
| 5,555,428 | A | * | 9/1996 | Radigan et al. | 712/22 |
| 5,727,229 | A | * | 3/1998 | Kan et al. | 712/22 |
| 5,867,724 | A | * | 2/1999 | McMahon | 712/22 |
| 6,304,955 | B1 | * | 10/2001 | Arora | 712/217 |
| 6,526,491 | B2 | | 2/2003 | Suzuoki et al. | |
| 2002/0135582 | A1 | * | 9/2002 | Suzuoki et al. | 345/502 |
| 2002/0138637 | A1 | * | 9/2002 | Suzuoki et al. | 709/230 |
| 2002/0138701 | A1 | * | 9/2002 | Suzuoki et al. | 711/154 |
| 2002/0156993 | A1 | * | 10/2002 | Suzuoki et al. | 712/30 |
| 2002/0174318 | A1 | * | 11/2002 | Stuttard et al. | 712/13 |
| 2003/0037221 | A1 | | 2/2003 | Gschwind et al. | |

OTHER PUBLICATIONS

Hwa-Joon Oh, Y. Totsuka, etc., "A fully pipelined single-precision floating-point unit in the synergistic processor element of a Cell processor", Jun. 2005, VLSI Circuits, 2005, Digest of Technical Papers, 2005 Symposium on Jun. 16-18, 2005.*

(Continued)

Primary Examiner—Niketa I Patel
Assistant Examiner—David E Martinez
(74) Attorney, Agent, or Firm—Matthew B. Dernier, Esq.; Gibson & Dernier LLP

(57) ABSTRACT

Methods and apparatus provide for disabling at least some data path processing circuits of a SIMD processing pipeline, in which the processing circuits are organized into a matrix of slices and stages, in response to one or more enable flags during a given cycle.

26 Claims, 12 Drawing Sheets

OTHER PUBLICATIONS

Mueller, Y. Totsuka, etc., "The vector floating-point unit in a synergistic processor element of a cell processor", Jun. 2005, Computer Arithmetic, 2005, 17th IEEE symposium on Jun. 27-29, 2005.*

O. Nishii, Y. Totsuka, etc., "A 200MHz 1.2W 1.4GFLOPS Microprocessor with Graphic Operation Unit", Feb. 1998, Solid-State Circuits Conference, IEEE 1998.*

Dac C. Pham, etc., "Overview of the Architecture, Circuit Design, and Physical Implementation of a First-Generation Cell Processor", Jan. 2006, IEEE Journal of Solid-State Circuits, vol. 41, No. 1.*

Samuel Williams, etc., "The potential of the Cell Processor for Scientific Computing", May 2006, CF'06 ACM.*

Osamu Takahashi, etc, "Power-Conscious Design of the Cell Processor's synergistic processor element", Sep./Oct. 2005, Micro (vol. 25, No. 5).*

H. Kapadia, etc., "Reducing Switching Activity on Datapath Buses with Control-Signal Gating", Mar. 1999, IEEE Journal of Solid-State Circuits, vol. 34, No. 3.*

Gurindar S. Sohi, "Instruction Issue logic for high-performance, interruptible, multiple functional unit, pieplined computers", Mar. 1990, IEEE transactions on computers, vol. 39, No. 3.*

D. A. Koufaty, "Data Forwarding in Scalable Shared-Memory Multiprocessors", Dec. 1996, IEEE transactions on Parallel and Distributed Systems.*

* cited by examiner

FIG. 3

| ENABLE FLAGS | SLICE 0 | SLICE 1 | SLICE 2 | SLICE 3 |
|---|---|---|---|---|
| 0 0 0 0 | DISABLE | DISABLE | DISABLE | DISABLE |
| 0 0 0 1 | DISABLE | DISABLE | DISABLE | *ENABLE* |
| 0 0 1 0 | DISABLE | DISABLE | *ENABLE* | DISABLE |
| 0 0 1 1 | DISABLE | DISABLE | *ENABLE* | *ENABLE* |
| 0 1 0 0 | DISABLE | *ENABLE* | DISABLE | DISABLE |
| 0 1 0 1 | DISABLE | *ENABLE* | DISABLE | *ENABLE* |
| 0 1 1 0 | DISABLE | *ENABLE* | *ENABLE* | DISABLE |
| 0 1 1 1 | DISABLE | *ENABLE* | *ENABLE* | *ENABLE* |
| 1 0 0 0 | *ENABLE* | DISABLE | DISABLE | DISABLE |
| 1 0 0 1 | *ENABLE* | DISABLE | DISABLE | *ENABLE* |
| 1 0 1 0 | *ENABLE* | DISABLE | *ENABLE* | DISABLE |
| 1 0 1 1 | *ENABLE* | DISABLE | *ENABLE* | *ENABLE* |
| 1 1 0 0 | *ENABLE* | *ENABLE* | DISABLE | DISABLE |
| 1 1 0 1 | *ENABLE* | *ENABLE* | DISABLE | *ENABLE* |
| 1 1 1 0 | *ENABLE* | *ENABLE* | *ENABLE* | DISABLE |
| 1 1 1 1 | *ENABLE* | *ENABLE* | *ENABLE* | *ENABLE* |

FIG. 10

DESTINATION REGISTER CONTENT

| STAGE | FLAGS | SLICE 0 | SLICE 1 | SLICE 2 | SLICE 3 |
|---|---|---|---|---|---|
| -- | -- | A | B | C | D |
| 3 | 0 0 0 1 | * | * | * | E |
| 2 | 1 0 0 0 | F | * | * | * |
| 1 | 0 1 0 0 | * | G | * | * |
| 0 | 1 1 0 0 | H | I | * | * |
| FORWARDING TO SOURCE REGISTERS | | H | I | C | E |

METHOD AND APPARATUS FOR ENABLE/DISABLE CONTROL OF SIMD PROCESSOR SLICES

BACKGROUND

The present invention relates to methods and apparatus for controlling a single instruction, multiple data (SIMD) processing pipeline.

In recent years, there has been an insatiable desire for faster computer processing data throughputs because cutting-edge computer applications involve real-time, multimedia functionality. Graphics applications are among those that place the highest demands on a processing system because they require such vast numbers of data accesses, data computations, and data manipulations in relatively short periods of time to achieve desirable visual results. These applications require extremely fast processing speeds, such as many thousands of megabits of data per second. While some processing systems employ a single processor to achieve fast processing speeds, others are implemented utilizing multi-processor architectures. In multi-processor systems, a plurality of sub-processors can operate in parallel (or at least in concert) to achieve desired processing results.

In a deep pipeline SIMD processor subject to varying latency data paths, the existence of scalar and vector (SIMD) operations may complicate data dependency checking. The SIMD processor may carry out many operations and/or instructions, each with its own, and potentially different, latency. For example, the Intel IA-32 SSE instruction set employs different instructions for scalar and SIMD computations/operations. Scalar operations use the same registers but always use the same slice. If unused slice words of a destination register have to remain unchanged, the complexity of proper pipeline operation and data forwarding is greatly increased.

Further, a SIMD processor includes a plurality of stages, where each stage may perform its operation at the same time and seek to dispose the result thereof in a destination register. Data dependency checking becomes more complex when two or more operations in the pipeline have the same destination register with different unused slices. Stall conditions may be exacerbated when write-after-write (WAW) dependency or read-after-write (RAW) dependency is encountered. RAW dependency is particularly problematic because each slice has a different dependency.

The complexity associated with dependency checking of unused slices may be addressed by reading the destination register (operand) of an instruction to be issued (e.g., the source registers) and pipelining the data of unused slices without modification. Unfortunately, this requires additional hardware for reading the destination register and may result in an increase in stalling. This is so because the destination operand (as well as the source operands) may have RAW dependencies. Still further, when the data of unused slices are pipelined without any modification, power savings are difficult to achieve.

Another way in which the complexity associated with dependency checking of unused slices may be addressed is by delaying or stalling the issuance of the instruction for a sufficient time for most operations (with the same destination register) in the pipeline to finish their write-back stage. Unfortunately, this may cause significant performance degradation.

SUMMARY OF THE INVENTION

In accordance with one or more embodiments of the present invention, flexibility is provided for individually enabling and disabling the SIMD slices without performance degradation (e.g., latency and/or throughput). This functionality is preferably provided by way of enable flags. There are a number of ways in which the enable flags may be implemented, such as (i) an enable flag is embedded in each SIMD instruction; (ii) an enable flag is specified by a prefix or a suffix control instruction that is added before or after each SIMD instruction (if no prefix/suffix control instruction exists, all slices are enabled); (iii) a control register is provided that stores a set of enable flags (the flags are selected using instruction-embedded code or prefix/suffix control instructions and dynamically modified using load or move instructions); and (iv) combination of the above.

Power savings may be achieved by controlling the clock signals to the SIMD slices using the enable flags. Data forwarding may be achieved as follows: The dependency check unit detects data dependency between the source register of instructions to be issued and the destination registers of operations in each pipeline stage. If dependency exists and the result is not yet valid, the instruction issue is stalled. If dependency exists and the result is valid, the result is forwarded to the operand of the instruction to be issued. The forwarding of the result, however, is preferably controlled individually for each slice in order to avoid stalls.

In accordance with one or more embodiments of the present invention, methods and apparatus provide for: disabling at least some data path processing circuits of a SIMD processing pipeline, in which the processing circuits are organized into a matrix of slices and stages, in response to one or more enable flags during a given cycle. Preferably, the step of disabling includes independently disabling the processing circuits in response to respective ones of the enable flags.

By way of example, the step of disabling may include interrupting clock signals to the respective processing circuits in response to states of the enable flags.

Alternatively or in addition, the step of disabling may include preventing respective data results from the respective processing circuits from being written to one or more destination registers as a function of the enable flags. It is also contemplated that a corollary to the disabling feature is the enabling of the forwarding of at least some results of the processing circuits to the source operand(s) of the pipeline.

Preferably, the step of disabling and/or forwarding is performed on a cycle-by-cycle basis.

In the context of dependency checking, the step of disabling is preferably based on determinations of a dependency check circuit and the enable flags, the dependency check circuit being operable to determine whether any operands of instructions yet to enter the slices of the pipeline are dependent on any of the data results of the processing circuits.

Other aspects, features, advantages, etc. will become apparent to one skilled in the art when the description of the invention herein is taken in conjunction with the accompanying drawings.

BRIEF DESCRIPTION OF THE DRAWINGS

For the purposes of illustrating the various aspects of the invention, there are shown in the drawings forms that are presently preferred, it being understood, however, that the invention is not limited to the precise arrangements and instrumentalities shown.

FIG. 3 is a diagram of a truth table illustrating relationships between enable flags and the operation of the processing pipeline of FIG. 2 and/or other embodiments herein;

FIG. 10 is a table illustrating the contents of a destination register and a forwarding operand controlled using the enable flags and the forwarding circuit of FIG. 9 and/or other embodiments herein;

DETAILED DESCRIPTION OF THE PRESENT INVENTION

Figure 1:
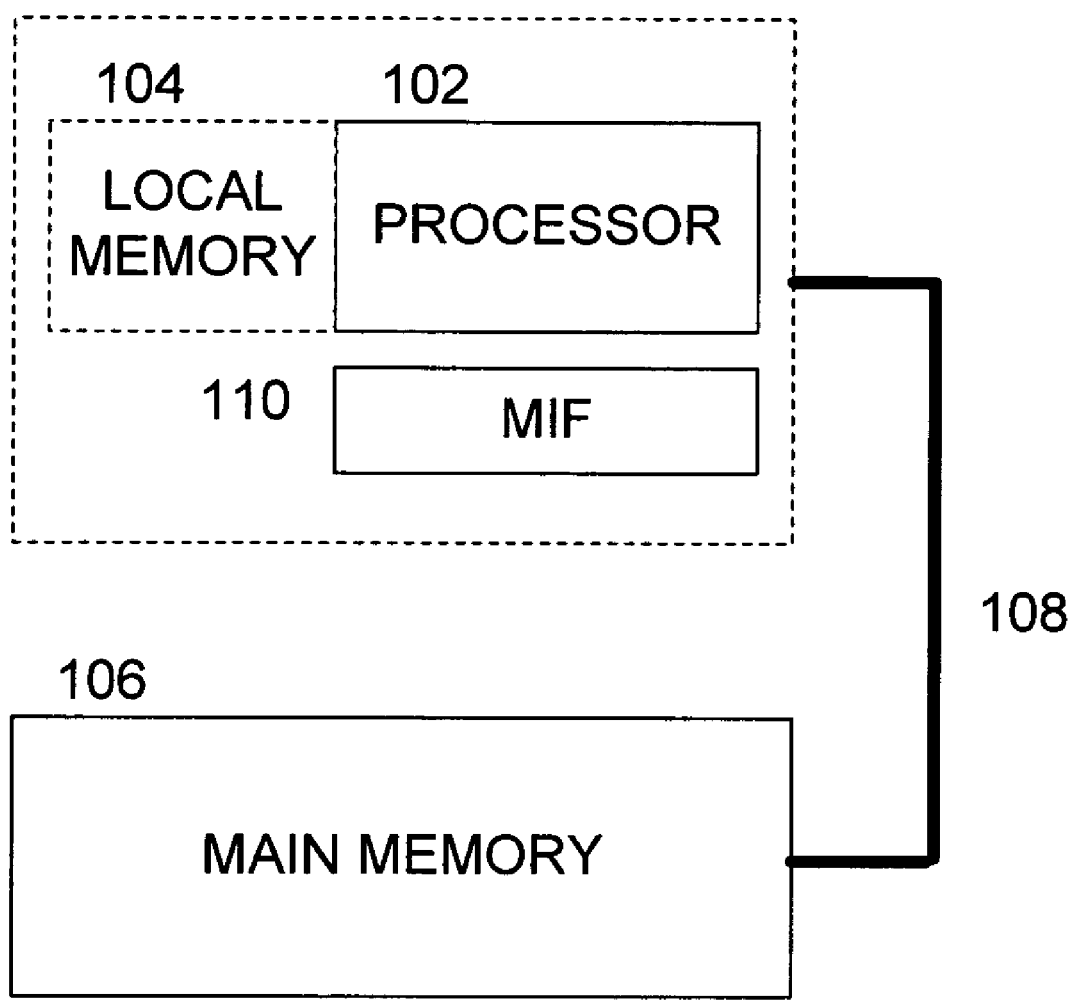
FIG. 1 is a block diagram illustrating the structure of a processing system that may be adapted in accordance with one or more aspects of the present invention.

With reference to the drawings, wherein like numerals indicate like elements, there is shown in FIG. 1 a processing system 100 that may be adapted for carrying out one or more features of the present invention. For the purposes of brevity and clarity, the block diagram of FIG. 1 will be referred to and described herein as illustrating an apparatus 100, it being understood, however, that the description may readily be applied to various aspects of a method with equal force.

The apparatus 100 preferably includes a processor 102, a local memory 104, a main memory 106 (e.g., a DRAM), and a bus 108. The processor 102 may be implemented utilizing any of the known technologies that are capable of requesting data from the system memory 106, and manipulating the data to achieve a desirable result. For example, the processor 102 may be implemented using any of the known microprocessors that are capable of executing software and/or firmware, including standard microprocessors, distributed microprocessors, etc. As will be discussed below, the processor 102 is preferably implemented using a processing pipeline. By way of example, the processor 102 may be a graphics processor that is capable of requesting and manipulating data, such as pixel data, including gray scale information, color information, texture data, polygonal information, video frame information, etc.

The local memory 104 is located in proximity to the processor 102 such that the processor may execute program code and otherwise manipulate data within the local memory 104 as opposed to the system memory 106. The local memory 104 may or may not be a traditional hardware cache memory. As on-chip space may be limited, the size of the local memory 104 may be much smaller than the system memory 106. The processor 102 preferably provides data access requests to copy data (which may include program data) from the system memory 106 over the bus 108 into the local memory 104 for program execution and data manipulation. The mechanism for facilitating data access is preferably implemented utilizing a direct memory access controller DMAC within the memory interface 110.

In accordance with one or more embodiments of the present invention, the processor 102 may execute software programs by copying executable code from the main memory 106 into the local memory 104 (via the memory interface (MIF) 110) and run the software programs within the local memory 104. As the local memory 104 may be relatively small (such as 256 KB), it may be desirable to permit portions of the software program (as opposed to the entire program) and any associated data to be copied into the local memory 104 and executed. This requires some mechanism by which to control and manage the movement of portions of the software program into the local memory, execution of the portions of the program, function calls, etc.

Figure 2:
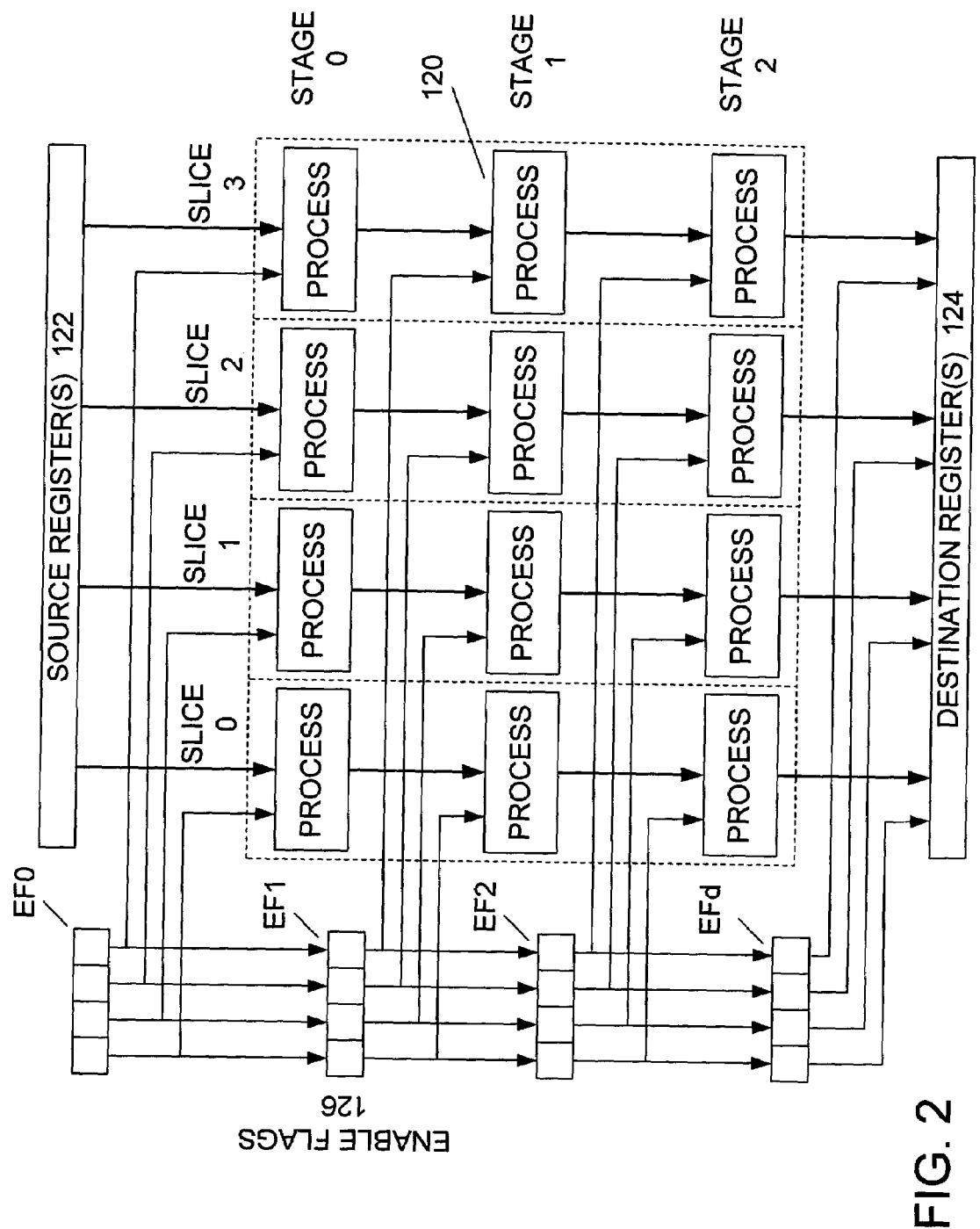
FIG. 2 is a block diagram illustrating a SIMD processing pipeline suitable for use in the processing system of FIG. 1 and/or other embodiments herein.

With reference to FIG. 2, the processor 102 is preferably implemented using a processing pipeline, in which logic instructions are processed in a pipelined fashion. The pipeline may be divided into any number of slices (four being shown) and any number of stages at which instructions are processed (three stages being shown). The pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

The processing pipeline may be composed of a plurality of data path processing circuits 120 organized into a matrix of M slices (slice 0, slice 1, slice 2, slice 3, . . . ) and N stages (stage 0, stage 1, stage 2, . . . ), where M and N are greater than 1. In accordance with SIMD processing techniques, the slices receive data operand(s) from one or more source registers 122, process the data in accordance with SIMD instructions, and write results of the data manipulations into one or more destination registers 124. It is noted that the results may be written to the destination registers 124 at specific stages of the pipeline (or specific cycles thereof) depending on the configuration of arithmetic logic units within the processing circuit 120 and the specific programming instructions being executed within the pipeline. If the results of a particular stage are ready (i.e., the operation is complete), the results pass through any remaining stages in the pipeline until the register write-back stage. Alternatively, the results may be temporarily held until the write-back cycle.

The processor 102 preferably includes a storage unit comprising a plurality of storage elements EF0, EF1, EF2, ..., where one element is associated with each of the processing stages. The storage elements hold a plurality of enable flags 126, most preferably organized into respective sets. Thus, each set of enable flags 126 is associated with one of the stages of the processing pipeline within a particular processing cycle. For example, in a given processing cycle enable flags 126 within EF0 may be associated with stage 0 of the processing pipeline, enable flags 126 within EF1 may be associated with stage 1 of the processing pipeline 1, and enable flags 126 within EF2 may be associated with stage 2 of the processing pipeline. In a next processing cycle, the enable flags 126 within EF2 will be discarded or will advance to a next processing stage (if a next stage exists), the enable flags 126 within EF1 will advance to EF2 and the enable flags 126 within EF0 will advance to EF1. As will be discussed in more detail hereinbelow, a new set of enable flags 126 will be input to EF0 in conjunction with a new SIMD instruction being issued into the pipeline. By way of example, the elements EF0, EF1, EF2, ... may be hardware registers, latches, etc. capable of holding one or more bits of information for each of the processing circuits 120 of the slices at a given stage of the pipeline.

In accordance with one or more embodiments of the present invention, at least some of the processing circuits 120 are operable to at least partially disable operation in response to one or more of the enable flags 126 during a given cycle.

Reference is now made to FIG. 3, which is a truth table illustrating a relationship between the enable flags 126 and the slices of the processing pipeline. For example, assuming the enable flags 126 within EF0 are 0, 0, 0, 0, the processing circuit 120 within slice 0, slice 1, slice 2, and slice 3 at stage 0 are preferably at least partially disabled during the given cycle. If the enable flags 126 are 0, 0, 0, 1, then the processing circuit 120 at slice 3, stage 0 is preferably enabled, while the other processing circuits 120 of that stage are preferably disabled. If the enable flags 126 are 0, 0, 1, 0, then the processing circuit 120 at slice 2, stage 0 is preferably enabled, while the other processing circuits 120 at that stage are preferably at least partially disabled. Similar relationships may be readily ascertained as to the other combinations of enable flags 126. In this way, the processing circuits 120 may be independently disabled (at least partially) in response to respective enable flags 126.

Figure 4:
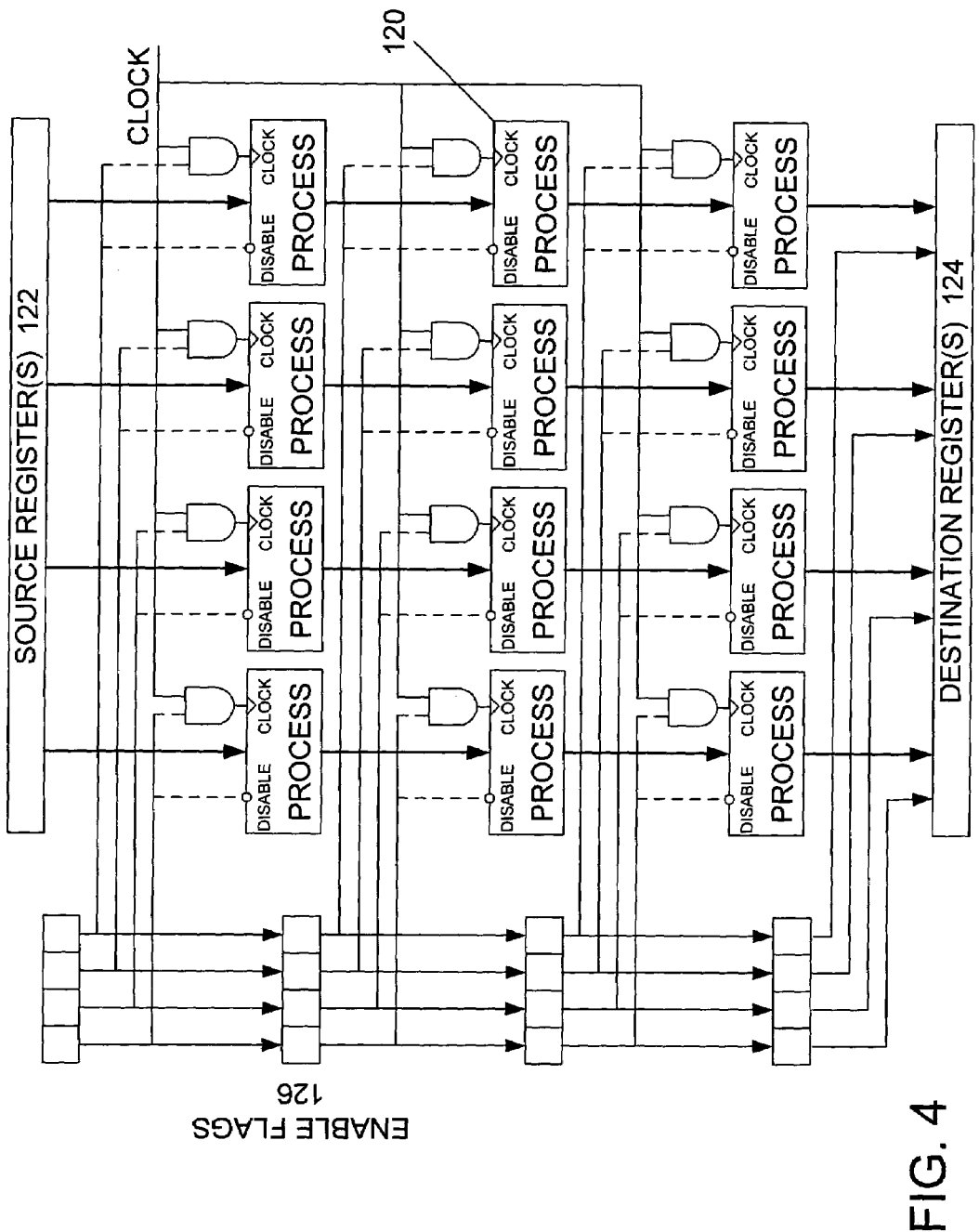
FIG. 4 is a block diagram illustrating an alternative SIMD processing pipeline suitable for use in the processing system of FIG. 1 and/or other embodiments herein.

With reference to FIG. 4, although suitable implementations of the digital hardware used to facilitate the partial or full disablement of the processing circuit 120 in response to the enable flags 126 are numerous, one possibility is that the processing circuits 120 may include a disable terminal (or equivalent input element) that facilitates the partial or full disablement of the processing circuit 120 in response to a state (e.g., logic true, false) of an enable flag 126 during a given cycle. In this regard, it preferred that the SIMD processing pipeline includes control logic and data path logic. The control logic produces one or more control signals that are responsive to the type of operation being performed in a given processing circuit 120, and control the processing behavior of the given circuit 120. The control signals may include clock gating signals, enable signals, etc. for various portions of the processing circuit 120. The enable flags 126 may be logically gated (e.g., ANDed) with one or more of the control signals to partially or fully disable the processing circuit 120. Alternatively, or in addition, the processing circuits 120 may include a gated clock input, where a state of the enable flag 126 gates the clock signal into that processing circuit 120 in order to disable the process during a giving cycle. This may be achieved by gating a result of the gated enable flags 126 and control signals with a clock signal.

The ability to enable/disable respective slices of the pipeline increases the apparent number of registers for certain operations, such as scalar operations, and permits different operations within each slice at a given stage utilizing relatively few SIMD instructions.

As will be discussed in more detail hereinbelow, the enable flags 126 may enable or disable the ability of a particular processing circuit 120 to transfer a processing result to the destination registers 124 during a given operating cycle. Advantageously, the ability to gate the clock to individual processing circuits 120 permits significant power savings without adversely impacting processing throughput.

Figure 5:
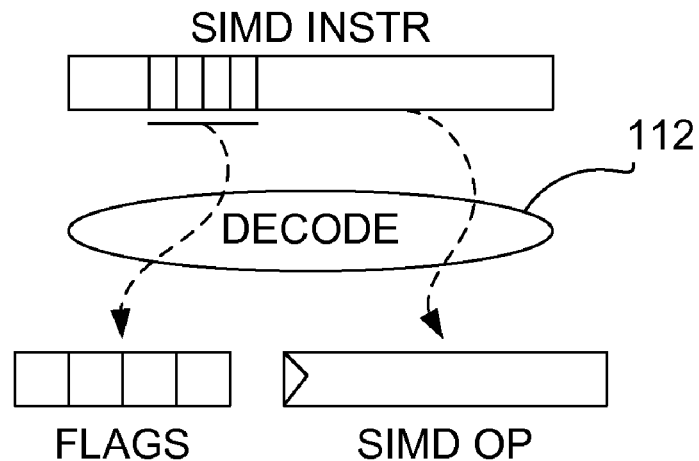
FIG. 5 is a block diagram illustrating that the enable flags may be invoked by decoding a SIMD instruction containing enable/disable information.

Reference is now made to FIG. 5, which is a block diagram illustrating a relationship between the enable flags and a SIMD instruction. Preferably, each set of enable flags 126 is associated with a respective SIMD instruction. As illustrated in FIG. 5, a set of enable flags 126 may be contained within a SIMD instruction and extracted during a decoding operation. Once extracted, the enable flags 126 may be transferred to the storage element EF0 when the SIMD operation is issued to the processing pipeline. Thereafter, the enable flags 126 associated with that SIMD instruction are preferably advanced to successive storage elements EF1, EF2, etc. during subsequent processing cycles.

Figure 6:
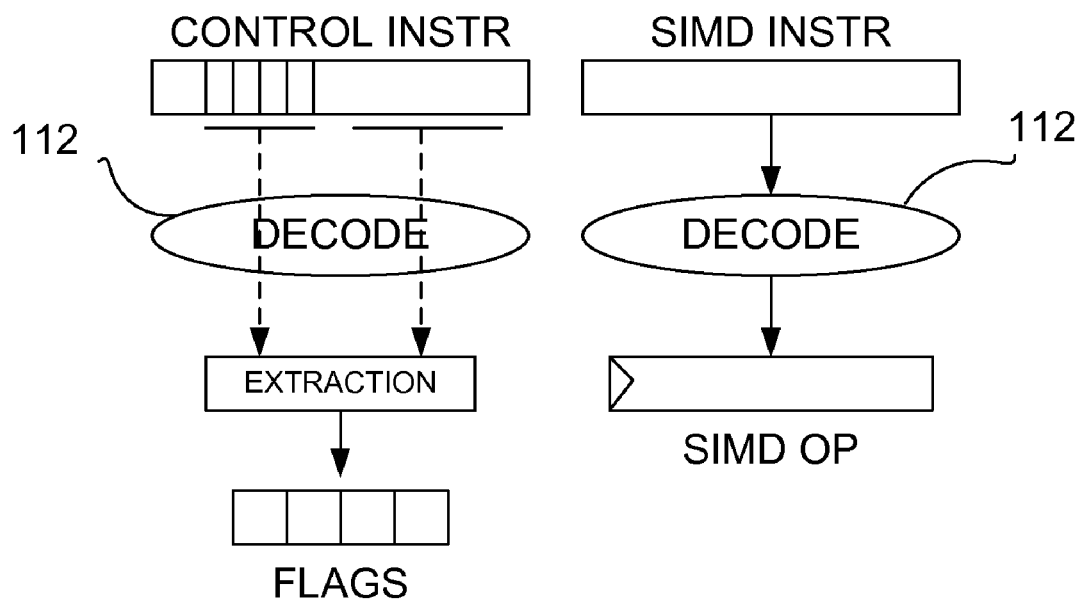
FIG. 6 is a block diagram illustrating that the enable flags may be invoked by decoding a SIMD control instruction containing enable/disable information, which is associated with a SIMD instruction.

With reference to FIG. 6, the enable flags 126 may be contained within a SIMD control instruction that is associated with a respective SIMD instruction. The SIMD control instruction may precede or follow the SIMD instruction (i.e., operate as a prefix or suffix). The enable flags 126 may be produced from the SIMD control instruction during a decode process by activating the enable flags via the extraction logic. For example, a portion of the SIMD control instruction may include four bits representing the enable flags 126, which are input to the extraction logic during the decode process. Another portion of the SIMD control instruction may be utilized during the decode process to activate or gate the bits within the extraction logic to produce the enable flags 126. In alternative embodiments, the extraction process of the enable flags 126 from the SIMD control instruction may be achieved utilizing any other technique within the knowledge of one skilled in the art having considered the disclosure herein.

Figure 7:
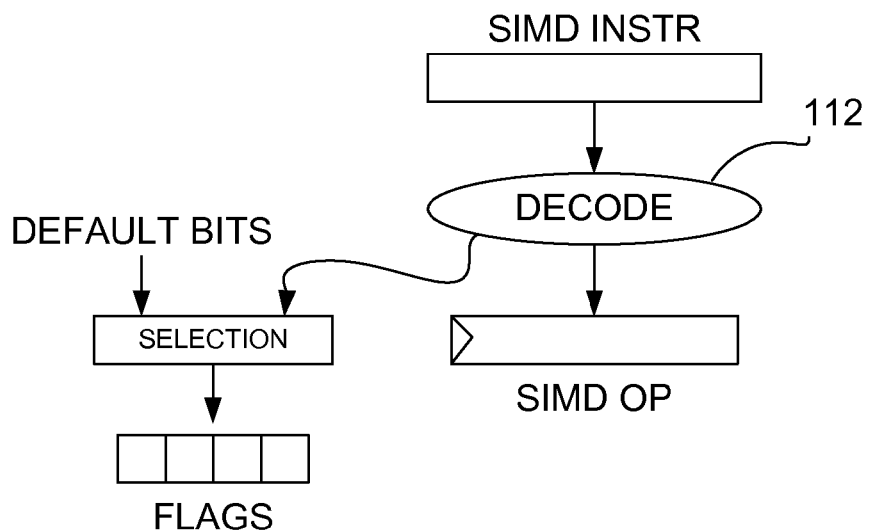
FIG. 7 is a block diagram illustrating that the enable flags may be invoked by decoding a SIMD instruction and using enable/disable information therein to select and/or alter predetermined bits.

With reference to FIG. 7, the enable flags 126 may be produced in response to default bits or information decoded from the SIMD instruction. For example, if the SIMD instruction includes enable flags 126, such may be selected by the selection logic. On the other hand, if the SIMD instruction does not include enable flags 126, the default bits (e.g., 1, 1, 1, 1) may produce the enable flags 126. By way of further example, if there is a SIMD control instruction associated with the SIMD instruction, the enable flags 126 may be obtained from the SIMD control instruction. If a SIMD instruction includes enable flags 126 therein, the enable flags 126 may be obtained from the SIMD instruction itself. Otherwise, the enable flags 126 may be obtained from the default bits.

Figure 8:
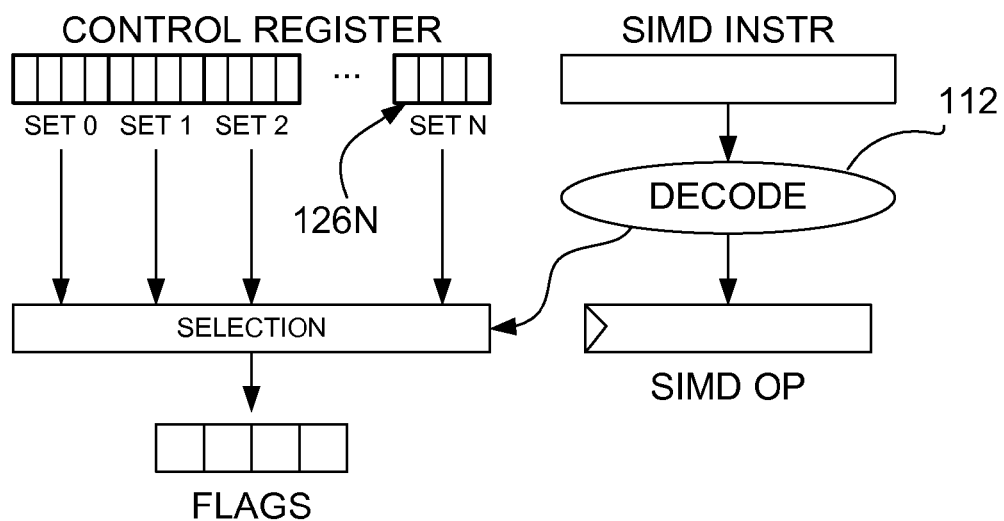
FIG. 8 is a block diagram illustrating that the enable flags may be invoked by decoding a SIMD instruction and using enable/disable information therein to select predetermined enable flags.

With reference to FIG. 8, the enable flags 126 may be produced in response to information decoded from a SIMD control instruction or a SIMD instruction itself, where the information is utilized to select a predetermined set of enable flags 126N. For example, the processor 102 may include a control register containing a plurality of sets of enable flags 126, such as set 0, set 1, set 2, . . . set N. The sets of enable flags 126 from the control register may be in communication with selection logic. The information obtained from the SIMD control instruction or the SIMD instruction may be input to the selection logic in order to select one of the N sets of enable flags 126. By way of example, the selection logic may represent a simple gating function or multiplexer circuit.

Those skilled in the art having considered the disclosure herein will appreciate that the enable flags may be produced in accordance with any one of the above-discussed techniques or combinations thereof.

Figure 9:
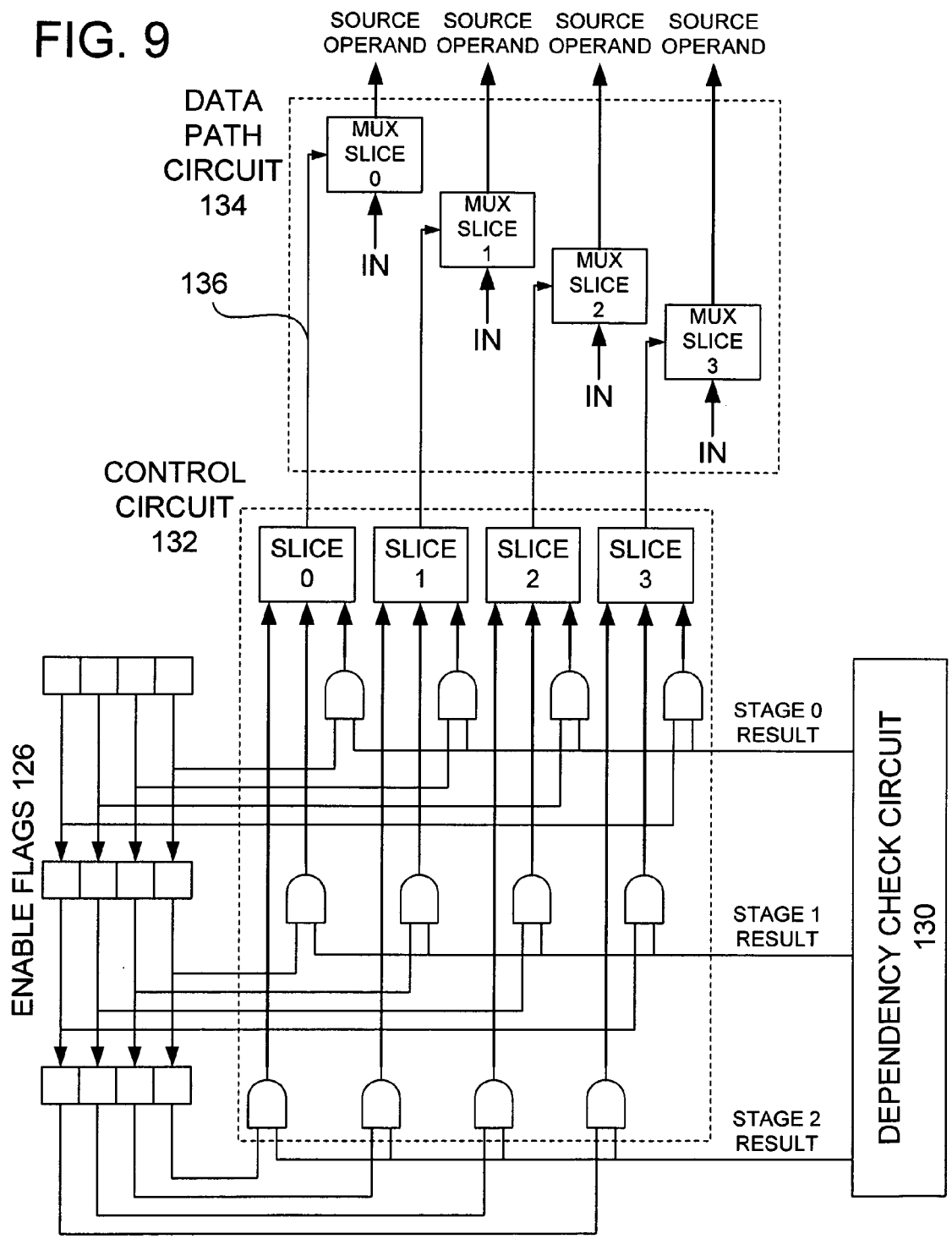
FIG. 9 is a block diagram illustrating a forwarding circuit suitable for use in the processing system of FIG. 1 and/or other embodiments herein.

Reference is now made of FIG. 9, which is a block diagram illustrating an example of a circuit configuration suitable for implementing the function of enabling the forwarding of used slice words in the results from the processing circuits 120 to the one or more source operand(s). In this embodiment of the present invention, the processor 102 may include a control circuit 132 and/or a data path circuit 134 that operate as a forwarding circuit in order to forward used slice words in the results from the respective processing circuits 120 to one or more source operands as a function of the enable flags 126. It is noted that the forwarding circuit may be utilized alone or in combination with the configurations of FIGS. 2 and/or 4 such that the additional function of disabling the writing of unused slice words in the results from the processing circuits 120 to the destination register 124 may also be achieved.

The control circuit 132 preferably receives the enable flags 126 and results from a dependency check circuit 130. The control circuit 132 may be implemented using a plurality of gates in order to produce respective forwarding control signals 136 for each slice. The respective forwarding control signals 136 are input to respective portions of the data path circuit 134 dedicated to each slice. The data path circuit 134 is operable to forward the used slice words to the one or more source operand(s) as a function of the enable flags 126. By way of example, each portion of the data path circuit 134 may be implemented using one or more multiplexers (or selectors), where inputs (IN) to each multiplexer may include one or more of: (i) results from each (or at least one) of the stages of the pipeline; and (ii) data from the source register 122.

The dependency check circuit 130 is operable to determine whether any operands of instructions yet to enter the slices of the pipeline are dependent on any of the data results of the processing circuits 120 within the pipeline. The dependencies are false when there are unused slice words, and the dependencies are true when there are used slice words in the result of the given processing circuit 120. The dependency check circuit 130 provides this determination by way of respective check results for each stage of the processing pipeline (STAGE 0 RESULT, STAGE 1 RESULT, etc.). Such check results are preferably gated with respect to the enable flags 126 within each stage in order to terminate any false dependencies and retain any true dependencies. The gating results are preferably input to slice logic in order to generate the forwarding control signals 136 that facilitate selection of a latest valid result in the earliest pipeline stage for each slice on a cycle-by-cycle basis.

The data path circuit 134 (e.g., selectors or multiplexers) selects the latest result based on the forwarding control signals 136 and delivers it to the source operand(s) for each slice. If there is no (true) dependency in one or more slices, the data that is read out from the source register 122 is selected and delivered to the source operand(s) for that slice. Preferably, the forwarding circuit (the control circuit 132 and/or the data path circuit 134) is operable to select data and facilitate delivery of same to the source operand(s) on a slice-by-slice basis (in other words independently, for each slice).

With reference to FIG. 10, an example of how the forwarding circuit may be utilized to control the forwarding of processing results to the source operands is illustrated. For the purposes of this example, it is assumed that the instruction to be issued into the processing pipeline contains an operand that is dependent on the results of one or more operations being performed by the processing circuits 120 within the processing pipeline. It is also assumed that the illustrated case involves a highly complex data dependence situation, e.g., where the same destination registers are used for all the operations being executed in stages 0, 1, 2, and 3.

It is assumed that the contents of the destination register 124 are initially A, B, C, D. At stage 3, the enable flags are 0, 0, 0, 1, which permits the result of processing circuit 120 of slice 3 (E) to be written to the destination register 124. At stage 2, the enable flags are 1, 0, 0, 0, which permits the results of processing circuit 120 of slice 0 (F) to be written to the destination register 124. At stage 1, the enable flags 126 are 0, 1, 0, 0, which permits the results from the processing circuit 120 of slice 1 (G) to be written to the destination register 124. At stage 0, the enable flags 126 are 1, 1, 0, 0, which permits the results from processing circuits 120 in slice 0 and slice 1 (H and I, respectively) to be written to the destination register 124.

At the end of every cycle, the operation (and the enable flags) in each stage proceed to the next stage (i.e., stage 0->stage 1->stage 2->stage 3, etc.).

According to the enable flags 126, the used slice words of the results are in turn written to the destination register 124 at a write-back stage. The unused slice words in the results are undefined and are not written to the destination register 124 during the write-back stage.

If the operations are completed at these or earlier stages (i.e., the results are ready), the following actions are preferably carried out: (i) for slice 0, H is forwarded from stage 0 to the source operand(s); (ii) for slice 1, I is forwarded from stage 0 to the source operand(s); (iii) for slice 2, C is read out from the source register 122 and selected for the source operand(s); and (iv) for slice 3, E is forwarded from stage 3 to the source operand(s). If the operation in at least stage 0 and stage 3 are not completed, the instruction issue will be stalled. The result of slice 0 at stage 2 (F) and the result of slice 1 at stage 1 (G) are candidates for forwarding. In actuality, the result of slice 0 and slice 1 at stage 0 (H, I) is forwarded to the source operand(s) instead of stage 1 and stage 2 because the result at stage 0 is latest. The ability to forward used slices (and not forward unused slices) of the pipeline to the source operands avoids unnecessary stalls.

Figure 11:
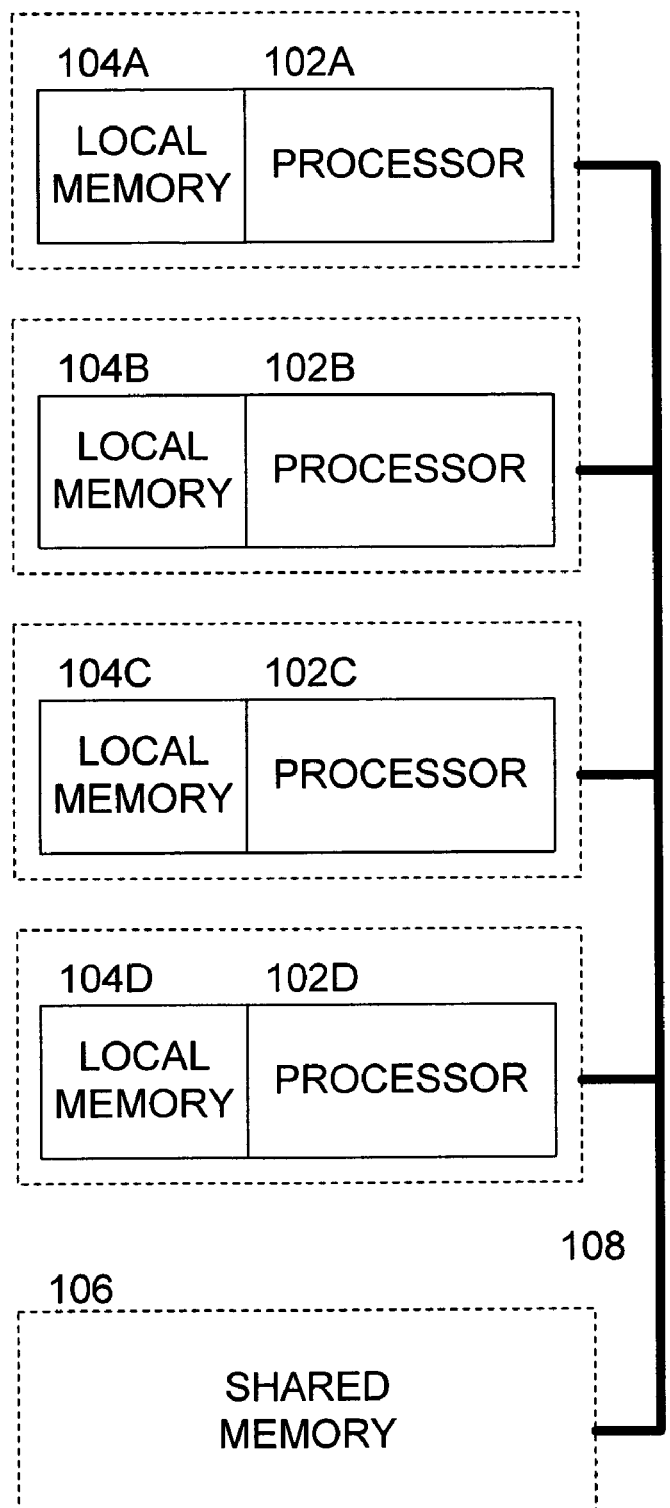
FIG. 11 is a diagram illustrating the structure of a multi-processing system having two or more sub-processors that may be adapted in accordance with one or more aspects of the present invention.

FIG. 11 is a block diagram of a multi-processing system 100A that may be adapted to implement the features discussed herein and one or more further embodiments of the present invention. The system 100A includes a plurality of processors 102A-D, associated local memories 104A-D, and a shared memory 106 interconnected by way of a bus 108. The shared memory 106 may also be referred to herein as a main memory or system memory. Although four processors 102 are illustrated by way of example, any number may be utilized without departing from the spirit and scope of the present invention. Each of the processors 102 may be of similar construction or of differing construction.

The local memories 104 are preferably located on the same chip (same semiconductor substrate) as their respective processors 102; however, the local memories 104 are preferably not traditional hardware cache memories in that there are no on-chip or off-chip hardware cache circuits, cache registers, cache memory controllers, etc. to implement a hardware cache memory function.

The processors 102 preferably provide data access requests to copy data (which may include program data) from the system memory 106 over the bus 108 into their respective local memories 104 for program execution and data manipulation. The mechanism for facilitating data access is preferably implemented utilizing a direct memory access controller (DMAC), not shown. The DMAC of each processor is preferably of substantially the same capabilities as discussed hereinabove with respect to other features of the invention.

The system memory 106 is preferably a dynamic random access memory (DRAM) coupled to the processors 102 through a high bandwidth memory connection (not shown). Although the system memory 106 is preferably a DRAM, the memory 106 may be implemented using other means, e.g., a static random access memory (SRAM), a magnetic random access memory (MRAM), an optical memory, a holographic memory, etc.

Each processor 102 is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the processors 102 may include an instruction buffer, instruction decode circuitry, dependency check circuitry, instruction issue circuitry, and execution stages.

In one or more embodiments, the processors 102 and the local memories 104 may be disposed on a common semiconductor substrate. In one or more further embodiments, the shared memory 106 may also be disposed on the common semiconductor substrate or it may be separately disposed.

In one or more alternative embodiments, one or more of the processors 102 may operate as a main processor operatively coupled to the other processors 102 and capable of being coupled to the shared memory 106 over the bus 108. The main processor may schedule and orchestrate the processing of data by the other processors 102. Unlike the other processors 102, however, the main processor may be coupled to a hardware cache memory, which is operable cache data obtained from at least one of the shared memory 106 and one or more of the local memories 104 of the processors 102. The main processor may provide data access requests to copy data (which may include program data) from the system memory 106 over the bus 108 into the cache memory for program execution and data manipulation utilizing any of the known techniques, such as DMA techniques.

A description of a preferred computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture.

The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 12:
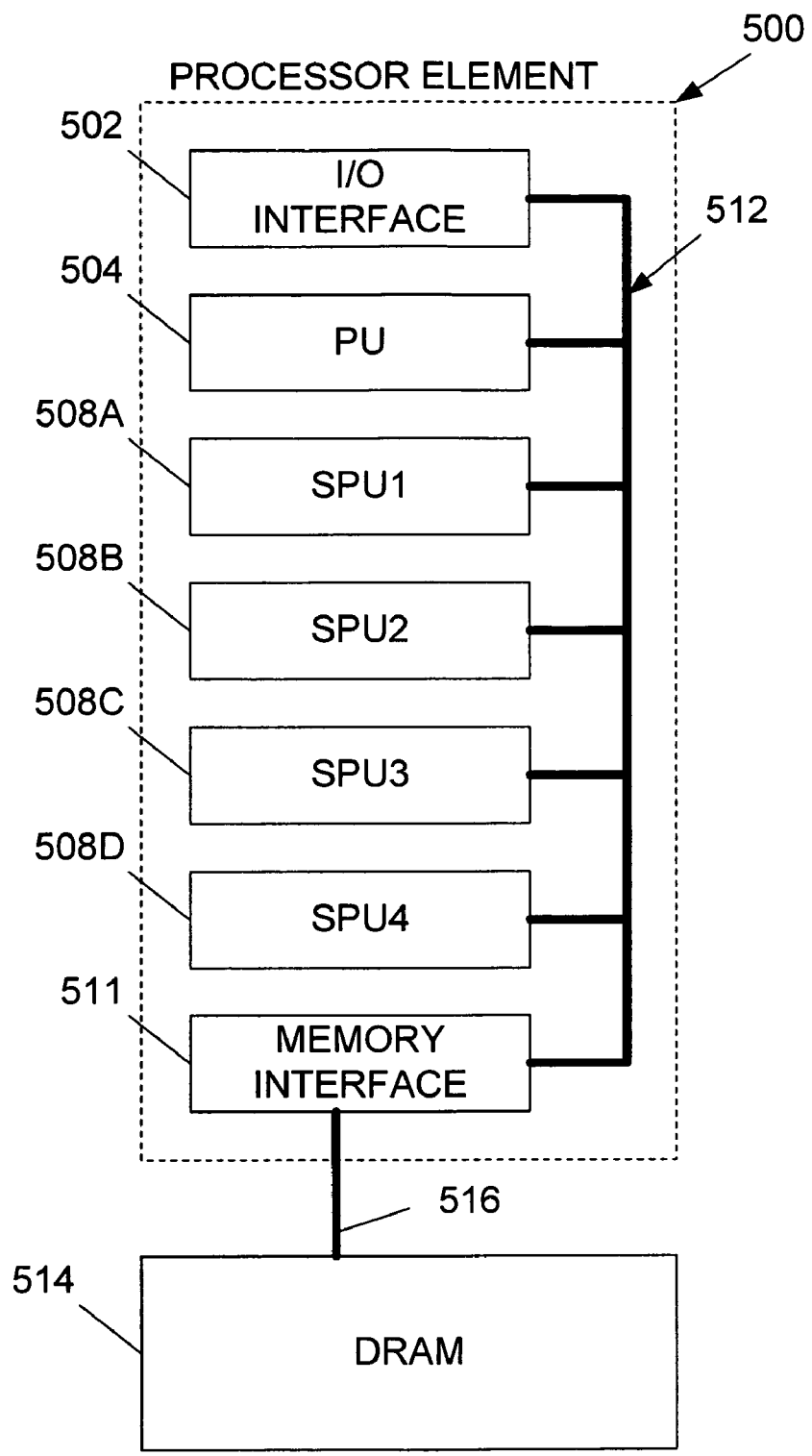
FIG. 12 is a diagram illustrating a preferred processor element (PE) that may be used to implement one or more further aspects of the present invention.

With reference to FIG. 12, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsinide, gallium aluminum arsinide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 13:
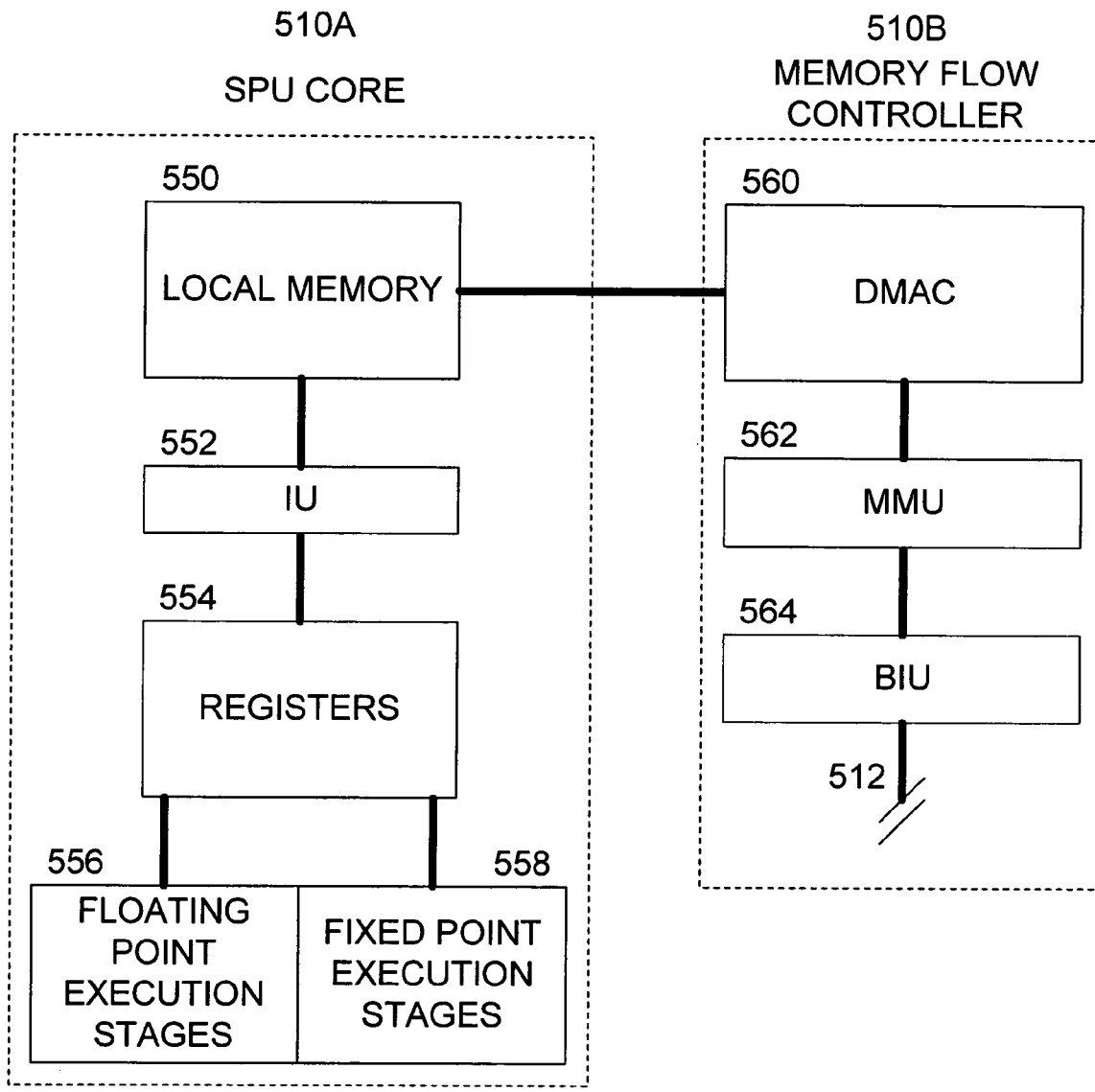
FIG. 13 is a diagram illustrating the structure of an exemplary sub-processing unit (SPU) of the system of FIG. 12 that may be adapted in accordance with one or more further aspects of the present invention.

FIG. 13 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 510A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution). It is preferred that the dependency check circuitry determines dependencies of multiple instructions dispatched from the decoder circuitry 112 simultaneously.

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M- byte page sizes and 256MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative segment lookaside buffer (SLB), a 256-entry, 4way set associative translation lookaside buffer (TLB), and a 4×4 Replacement Management Table (RMT) for the TLB —used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include state lost and isolated (SLI) commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 14:
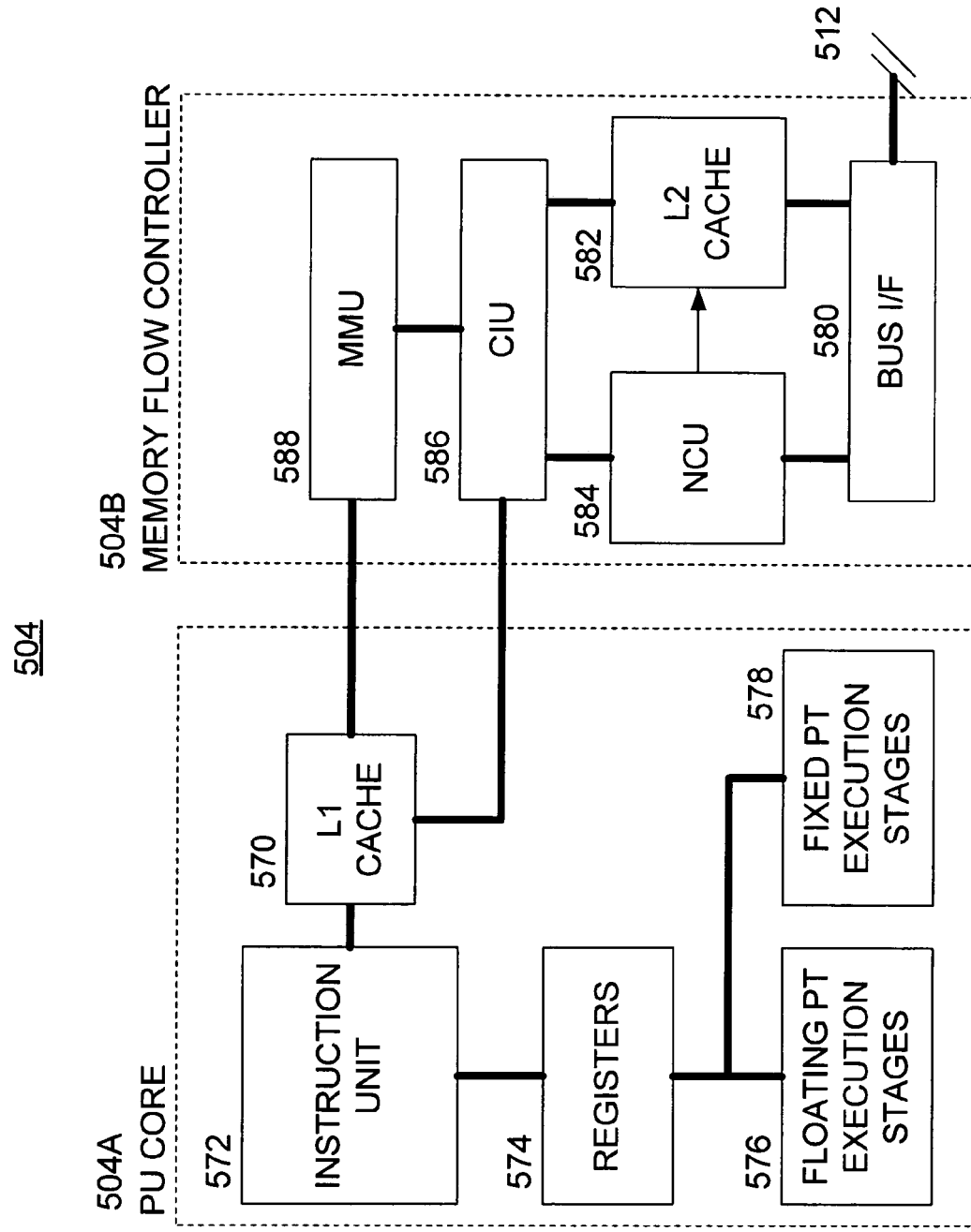
FIG. 14 is a diagram illustrating the structure of an exemplary processing unit (PU) of the system of FIG. 12 that may be adapted in accordance with one or more further aspects of the present invention.

FIG. 14 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space of the system 100.

The PU core 504A may include an L1 cache 570, an instruction unit 572, registers 574, one or more floating point execution stages 576 and one or more fixed point execution stages 578. The L1 cache provides data caching functionality for data received from the shared memory 106, the processors 102, or other portions of the memory space through the MFC 504B. As the PU core 504A is preferably implemented as a superpipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cacheable unit (NCU) 584, a core interface unit (CIU) 586, and a memory management unit (MMU) 588. Most of the MFC 504B runs at half frequency (half speed) as compared with the PU core 504A and the bus 108 to meet low power dissipation design objectives.

The BIU 580 provides an interface between the bus 108 and the L2 cache 582 and NCU 584 logic blocks. To this end, the BIU 580 may act as a Master as well as a Slave device on the bus 108 in order to perform fully coherent memory operations. As a Master device it may source load/store requests to the bus 108 for service on behalf of the L2 cache 582 and the NCU 584. The BIU 580 may also implement a flow control mechanism for commands which limits the total number of commands that can be sent to the bus 108. The data operations on the bus 108 may be designed to take eight bytes and, therefore, the BIU 580 is preferably designed around 128 byte cache-lines and the coherency and synchronization granularity is 128KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queueing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cacheable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 504A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64- bit implementation. The registers are preferably 64 bits long (although one or more special purpose registers may be smaller) and effective addresses are 64 bits long. The instruction unit 572, registers 574 and execution stages 576 and 578 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus, comprising:
    a SIMD processing pipeline having a plurality of data path processing circuits organized into a matrix of M slices and N stages, where M and N are greater than 1 and each data path processing circuit of a given slice and a given stage operates to execute at least a portion of a SIMD instruction and pass a result thereof to a next data path processing circuit of the given slice and a subsequent stage until a destination register of the SIMD processing pipeline is reached; and
    a storage circuit operating to: (i) store respective sets of enable flags, each set having a respective enable flag for each processing circuit in a respective one of the stages and each set of enable flags being associated with a given SIMD instruction, and (ii) transfer the sets of enable flags from one stage for use with the processing circuits of a next stage each cycle,
    wherein at least some of the processing circuits at each stage are operable to at least partially disable operation in response to the enable flags transferred to the given stage during the given cycle.

2. The apparatus of claim 1, further comprising: a clock interrupt circuit responsive to states of the enable flags by interrupting clock signals to the respective processing circuits.

3. The apparatus of claim 1, further comprising: one or more control circuits operable to at least one of: (i) disable respective data results from the respective processing circuits from being written to one or more destination registers as a function of the enable flags; and (ii) enable the forwarding of results from the processing circuits to the one or more source operands to the pipeline.

4. The apparatus of claim 3, wherein at least one of:
    the one or more control circuits are operable to disable the writing of unused slice words in the results from the processing circuits to the destination register;
    the one or more control circuits are operable to enable the forwarding of used slice words in the results from the processing circuits to the one or more source operands; and
    the one or more control circuits are operable to perform the disable and/or enable function on a cycle-by-cycle basis.

5. The apparatus of claim 3, further comprising:
    a dependency check circuit operable to determine whether any operands of instructions yet to enter the slices of the pipeline are dependent on any of the data results of the processing circuits, wherein the one or more control circuits are operable to disable or enable the forwarding function of the respective processing circuits based on the determinations of the dependency check circuit and the enable flags.

6. The apparatus of claim 1, wherein each set of enable flags is associated with a respective SIMD instruction.

7. The apparatus of claim 1, wherein the respective sets of enable flags are at least one of:
contained within each SIMD instruction and are extracted and transferred to the storage circuit;
contained within respective SIMD control instructions, each control instruction being associated with a respective one of the SIMD instructions, and the enable flags being produced from the SIMD control instructions and transferred to the storage circuit;
produced in response to at least one of an absence of enable flags within the SIMD instructions and an absence of SIMD control instructions by selecting a predetermined set of bits; and
produced in response to information decoded from at least one of the SIMD control instructions and the SIMD instructions and used to select a predetermined set of enable flags.

8. The apparatus of claim 7, wherein the SIMD control instructions are processed at least one of before, during, and after the SIMD instructions.

9. The apparatus of claim 7, further comprising a storage circuit operable to store a plurality of predetermined sets of enable flags, the information decoded from at least one of the SIMD control instructions and the SIMD instructions being used to select one of the predetermined sets of enable flags.

10. A method, comprising:
organizing a SIMD processing pipeline having a plurality of data path processing circuits into a matrix of M slices and N stages, where M and N are greater than 1 and each data path processing circuit of a given slice and a given stage operates to execute at least a portion of a SIMD instruction and pass a result thereof to a next data path processing circuit of the given slice and a subsequent stage until a destination register of the SIMD processing pipeline is reached;
storing respective sets of enable flags in a storage circuit of the SIMD processing pipeline, each set having a respective enable flag for each processing circuit in a respective one of the stages and each set of enable flags being associated with a given SIMD instruction;
transferring the sets of enable flags from one stage for use with the processing circuits of a next stage each cycle; and
disabling at least some data path processing circuits in response to the enable flags transferred to the given stage during the given cycle.

11. The method of claim 10, wherein the step of disabling includes independently disabling the processing circuits in response to respective ones of the enable flags.

12. The method of claim 10, wherein the step of disabling includes interrupting clock signals to the respective processing circuits in response to states of the enable flags.

13. The method of claim 10, wherein at least one of:
the step of disabling includes preventing respective data results from the respective processing circuits from being written to one or more destination registers as a function of the enable flags; and
the method further comprises enabling the forwarding of results from the processing circuits to the one or more source operands to the pipeline.

14. The method of claim 13, wherein at least one of:
the step of disabling includes disabling the writing of unused slice words in the results from the processing circuits to the destination register;
the step of forwarding includes enabling the forwarding of used slice words in the results from the processing circuits to the one or more source operands; and
the step of disabling and/or forwarding is performed on a cycle-by-cycle basis.

15. The method of claim 13, wherein the steps of disabling and/or enabling are based on determinations of a dependency check circuit and the enable flags, the dependency check circuit being operable to determine whether any operands of instructions yet to enter the slices of the pipeline are dependent on any of the data results of the processing circuits.

16. The method of claim 10, wherein each set of enable flags is associated with a respective SIMD instruction.

17. The method of claim 10, further comprising at least one of:
providing the respective sets of enable flags within respective SIMD instructions and extracting the enable flags for storage
providing the respective sets of enable flags within respective SIMD control instructions, associating each control instruction with a respective one of the SIMD instructions, and producing the enable flags from the SIMD control instructions for storage;
decoding the respective SIMD instructions and selecting a predetermined set of bits to produce the respective sets of enable flags when at least one of a given SIMD instruction does not include enable flags and there are no SIMD control instructions; and
decoding information from at least one of the SIMD control instructions and the SIMD instructions and using the information to select a predetermined set of enable flags.

18. A computer readable storage medium containing an executable program, the executable program being operable to cause a processing system to execute actions including:
interacting with a SIMD processing pipeline having a plurality of data path processing circuits into a matrix of M slices and N stages, where M and N are greater than 1 and each data path processing circuit of a given slice and a given stage operates to execute at least a portion of a SIMD instruction and pass a result thereof to a next data path processing circuit of the given slice and a subsequent stage until a destination register of the SIMD processing pipeline is reached;
storing respective sets of enable flags in a storage circuit of the SIMD processing pipeline, each set having a respective enable flag for each processing circuit in a respective one of the stages and each set of enable flags being associated with a given SIMD instruction;
transferring the sets of enable flags from one stage for use with the processing circuits of a next stage each cycle; and
disabling at least some data path processing circuits in response to the enable flags transferred to the given stage during the given cycle, wherein at least one of:
the step of disabling includes preventing respective data results from the respective processing circuits from being written to one or more destination registers as a function of the enable flags; and
the actions further comprise enabling the forwarding of results from the processing circuits to the one or more source operands to the pipeline.

19. The storage medium of claim 18, wherein the step of disabling includes independently disabling the processing circuits in response to respective ones of the enable flags.

20. The storage medium of claim 18, wherein the step of disabling includes interrupting clock signals to the respective processing circuits in response to states of the enable flags.

21. The storage medium of claim 18, wherein at least one of:
the step of disabling includes disabling the writing of unused slice words in the results from the processing circuits to the destination register;
the step of forwarding includes enabling the forwarding of used slice words in the results from the processing circuits to the one or more source operands; and
the step of disabling and/or forwarding is performed on a cycle-by-cycle basis.

22. An apparatus, comprising:
a SIMD processing pipeline having a plurality of data path processing circuits organized into a matrix of M slices and N stages, where M and N are greater than 1 and each data path processing circuit of a given slice and a given stage operates to execute at least a portion of a SIMD instruction and pass a result thereof to a next data path processing circuit of the given slice and a subsequent stage until a destination register of the SIMD processing pipeline is reached;
a storage circuit operating to: (i) store respective sets of enable flags, each set having a respective enable flag for each processing circuit in a respective one of the stages and each set of enable flags being associated with a given SIMD instruction, and (ii) transfer the sets of enable flags from one stage for use with the processing circuits of a next stage each cycle; and
a forwarding circuit operable to enable or disable the forwarding of results from the processing circuits to the one or more source operands to the pipeline in response to one or more enable flags during a given cycle,
wherein at least some of the processing circuits at each stage are operable to at least partially disable operation in response to the enable flags transferred to the given stage during the given cycle.

23. The apparatus of claim 22, wherein at least one of:
the forwarding circuit is operable to enable the forwarding of used slice words in the results from the processing circuits to the one or more source operands;
the forwarding circuit is operable to disable the forwarding of unused slice words in the results from the processing circuits to the one or more source operands;
the forwarding circuit is operable to perform the disable and/or enable function on a slice-by-slice basis;
the forwarding circuit is operable to perform the disable and/or enable function on a cycle-by-cycle basis.

24. The apparatus of claim 22, further comprising:
a dependency check circuit operable to determine whether any operands of instructions yet to enter the slices of the pipeline are dependent on any of the data results of the processing circuits,
wherein the forwarding circuit is operable to disable or enable the forwarding function of the respective processing circuits based on the determinations of the dependency check circuit and the enable flags.

25. The apparatus of claim 22, wherein each set of enable flags is associated with a respective SIMD instruction.

26. The apparatus of claim 25, wherein the respective sets of enable flags are at least one of:
contained within each SIMD instruction and are extracted and transferred to the storage circuit;
contained within respective SIMD control instructions, each control instruction being associated with a respective one of the SIMD instructions, and the enable flags being produced from the SIMD control instructions and transferred to the storage circuit;
produced in response to at least one of an absence of enable flags within the SIMD instructions and an absence of SIMD control instructions by selecting a predetermined set of bits; and
produced in response to information decoded from at least one of the SIMD control instructions and the SIMD instructions and used to select a predetermined set of enable flags.

* * * * *

UNITED STATES PATENT AND TRADEMARK OFFICE
CERTIFICATE OF CORRECTION

PATENT NO. : 7,644,255 B2
APPLICATION NO. : 11/034693
DATED : January 5, 2010
INVENTOR(S) : Yonetaro Totsuka It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 856 days.

Signed and Sealed this

Sixteenth Day of November, 2010

David J. Kappos
*Director of the United States Patent and Trademark Office*